A. GAERTNER.
Catch for Boxes.
No. 213,102. Patented Mar. 11, 1879.
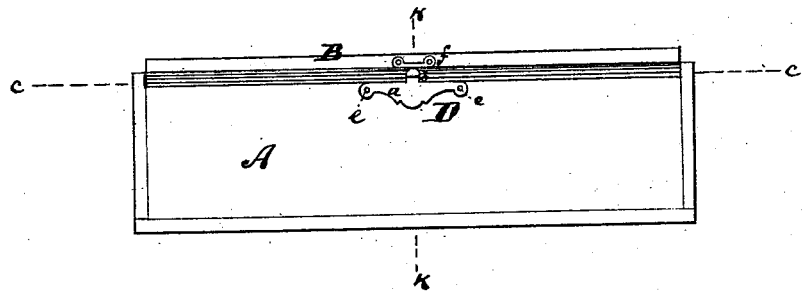
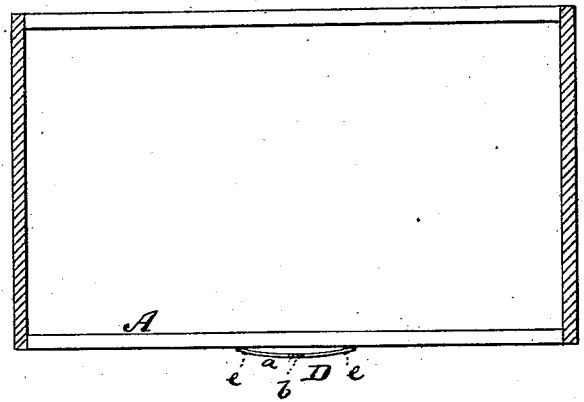
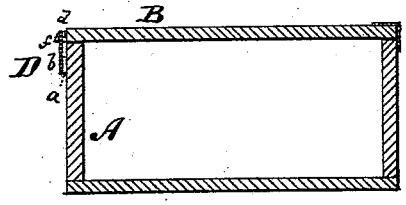 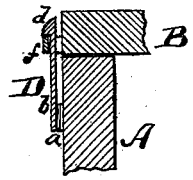
Witnesses:
John C. Tunbridge.
Wm. Schultz.
Inventor:
Adolph Gaertner
by his attorney
A. v. Briesen

UNITED STATES PATENT OFFICE.

ADOLPH GAERTNER, OF NEW YORK, N. Y., ASSIGNOR TO LEWIS PATTBERG & BROTHERS, OF SAME PLACE.

IMPROVEMENT IN CATCHES FOR BOXES.

Specification forming part of Letters Patent No. 213,102, dated March 11, 1879; application filed January 6, 1879.

*To all whom it may concern:*

Be it known that I, ADOLPH GAERTNER, of New York city, county and State of New York, have invented an Improved Catch for Boxes, of which the following is a specification:

Figure 1 is a front view of a cigar-box having my improved fastener. Fig. 2 is a horizontal section of same on line $c\ c$, Fig. 1; Fig. 3, a vertical transverse section of same on line $k\ k$, Fig. 1; Fig. 4, a detail cross-section, on an enlarged scale, of the catch.

Similar letters of reference indicate corresponding parts in all the figures.

This invention relates to a new catch or fastener for cigar and other boxes; and consists, principally, in the use of a T-shaped hook, whose lower bar is contracted or bulged out, and fastened at both ends to the box, to constitute a spring-catch, all as hereinafter more fully described.

In the accompanying drawings, the letter A represents the body, and B the lid or cover, of a suitable box. To the body A is secured the T-shaped hook or catch D, which is composed of a lower cross-bar, $a$, and an upright stem, $b$. The hook proper, $d$, is formed on the stem $b$, as clearly shown in Fig. 4.

The catch D is made of sheet metal or equivalent elastic material. The cross-piece $a$ is bent or bulged outward, as shown in Fig. 2, and at its ends fastened to the box by suitable nails, tacks, or prongs $e$, so that when fastened it is contracted or shorter than its full length before being fastened. By this means the cross-piece is made a spring, which will throw the hook $d$ out into the locking position, and which, when slightly pressed inward with the finger, will yield sufficiently to carry the hook $d$ inward with it.

A suitable loop or eye, $f$, is secured to or formed on the lid B for the reception of the hook $d$. The box is self-locking, as the hook enters the loop as soon as the lid is closed down, the spring $a$ throwing the hook out over the edge of the loop, as clearly shown in Fig. 4.

In order to open the box, it is only necessary to press against the spring $a$, thereby carrying the hook off the edge of the loop and permitting the opening of the lid. This fastening device is applicable to all kinds of boxes, trunks, and the like, and has the advantage of leaving the box intact, as it can be applied without cutting away any portion of the box. It is, moreover, economical, and can readily be made an ornament to the box.

I claim—

The T-shaped catch D, having the lower bulged or contracted cross-piece, $a$, and the stem $b$ and hook $d$, to serve as a spring-catch, in combination with the fastening-pins $e\ e$, which secure the cross-piece directly in place at the ends, substantially as specified.

The foregoing description of my invention signed by me this 21st day of December, 1878.

ADOLPH GAERTNER.

Witnesses:
F. V. BRIESEN,
A. V. BRIESEN.